(12) United States Patent
Venturi

(10) Patent No.: US 9,162,578 B2
(45) Date of Patent: *Oct. 20, 2015

(54) SPEED VARIATION TRANSMISSION DEVICE FOR MOTOR VEHICLE POWERTRAIN AND HYBRID MOTOR VEHICLE USING SAME

(75) Inventor: Stéphane Venturi, Roiffieux (FR)

(73) Assignee: IFP Energies nouvelles, Rueil Malmaison Cedex (FR)

(*) Notice: Subject to any disclaimer, the term of this patent is extended or adjusted under 35 U.S.C. 154(b) by 712 days.

This patent is subject to a terminal disclaimer.

(21) Appl. No.: 12/987,268

(22) Filed: Jan. 10, 2011

(65) Prior Publication Data

US 2011/0172044 A1    Jul. 14, 2011

(30) Foreign Application Priority Data

Jan. 14, 2010 (FR) ..................... 10 00128

(51) Int. Cl.
| | | |
|---|---|---|
| B60K 6/383 | (2007.10) |
| B60L 11/14 | (2006.01) |
| B60K 6/48 | (2007.10) |
| B60L 7/18 | (2006.01) |
| F16H 3/72 | (2006.01) |
| F16H 37/08 | (2006.01) |

(52) U.S. Cl.
CPC ............... B60L 11/14 (2013.01); B60K 6/383 (2013.01); B60K 6/48 (2013.01); B60L 7/18 (2013.01); F16H 3/724 (2013.01); B60K 2006/4808 (2013.01); B60L 2200/26 (2013.01); F16H 37/0806 (2013.01); F16H 2200/2005 (2013.01); Y02T 10/626 (2013.01); Y02T 10/6221 (2013.01); Y02T 10/70 (2013.01); Y02T 10/7077 (2013.01)

(58) Field of Classification Search
None
See application file for complete search history.

(56) References Cited

U.S. PATENT DOCUMENTS

| | | |
|---|---|---|
| 5,168,975 A | 12/1992 | Bernhardt et al. |
| 5,607,369 A | 3/1997 | Yang |
| 6,344,008 B1 | 2/2002 | Nagano et al. |
| 6,641,498 B2 * | 11/2003 | Okuwaki ............... 475/117 |
| 2009/0062997 A1 * | 3/2009 | Iwase et al. ............. 701/68 |
| 2010/0029433 A1 * | 2/2010 | Tenberge ............... 475/219 |
| 2013/0172146 A1 * | 7/2013 | Venturi .................... 477/5 |

FOREIGN PATENT DOCUMENTS

| | | |
|---|---|---|
| DE | 102007033418 | 1/2009 |
| FR | 2670440 | 6/1992 |

* cited by examiner

*Primary Examiner* — Erin D Bishop
(74) *Attorney, Agent, or Firm* — Fitch, Even, Tabin & Flannery LLP

(57) ABSTRACT

The present invention relates to a speed variation transmission device for a motor vehicle powertrain comprising an epicyclic gear train (26) with a sun gear (36) and a crown (50) connected to shaft (12) of thermal engine (10) of said vehicle, as well as a planet gear carrier (58) connected by a motion transmission track (102) to drive axle (16) of this vehicle. According to the invention, sun gear (36) and crown (50) are connected each to engine shaft (12) by a controlled coupling (28, 30) and to a fixed part (48a, 48b) of the vehicle powertrain by a one-way coupling (32, 34).

8 Claims, 12 Drawing Sheets

SPEED VARIATION TRANSMISSION DEVICE FOR MOTOR VEHICLE POWERTRAIN AND HYBRID MOTOR VEHICLE USING SAME

FIELD OF THE INVENTION

The present invention relates to a speed variation transmission device for driving a motor vehicle.

It concerns an application of this speed variation transmission device to a hybrid motor vehicle.

As it is widely known, this type of vehicle comprises a powertrain which combines, as a drive means (propulsion or traction), a thermal engine, generally an internal-combustion engine, and a rotary electric machine connected to an electric source, such as one or more electric accumulators or batteries.

This combination allows the performances of this vehicle to be optimized, as regards the decrease in the discharge of emissions to the atmosphere as well as the fuel consumption decrease.

BACKGROUND OF THE INVENTION

As better described in French patent No. 2,670,440, this vehicle comprises a powertrain with a thermal engine including a speed variation device and an electric machine connected to an electric battery. This system also comprises two clutches, a first clutch between the thermal engine and the electric machine, and a second clutch between the electric machine and the speed variation device.

Thus, when the vehicle is to be driven with a high torque over a wide speed range while limiting exhaust gas and noise generation, as in an urban site, the electric machine is preferably used for driving this vehicle.

On the other hand, the thermal engine is used for driving this vehicle for uses where a high driving power and a wide operating range are required.

Although satisfactory, this drive system however involves some significant drawbacks.

In fact, when only the electric machine is used to drive the vehicle, sufficient torque is required therefrom, not only to drive the vehicle, but also to overcome all the resistances (inertia, friction, . . . ) inherent in the vehicle and in the speed variation device.

A hybrid vehicle has also been proposed, notably in U.S. Pat. No. 6,344,008, wherein part of the speed variation transmission device comprises an epicyclic gear train with a crown, a sun gear and a planet gear carrier.

In this type of epicyclic gear train, it is difficult to control the direction of rotation of the various elements, which can go against the desired one. This leads to parasitic stresses and load torques that prejudice the smooth running of this epicyclic gear.

The present invention aims to overcome the aforementioned drawbacks by means of a simple and reliable speed variation device allowing the required speed level to be obtained.

SUMMARY OF THE INVENTION

The invention therefore relates to a speed variation transmission device for a motor vehicle powertrain comprising an epicyclic gear train with a sun gear and a crown connected to the shaft of the thermal engine of said vehicle, as well as a planet gear carrier connected by a motion transmission track to drive axle of this vehicle, characterized in that the sun gear and the crown are connected each to the engine shaft by a controlled coupling and to a fixed part of the vehicle by a one-way coupling.

Preferably, the one-way coupling can comprise a free wheel.

The controlled coupling can comprise a friction clutch whose friction disk is carried by the engine shaft.

The controlled coupling can comprise a friction clutch whose friction disk is carried by the sun gear shaft.

The controlled coupling can comprise a friction clutch whose friction disk is carried by the crown shaft.

The sun gear can be connected to the fixed part of the vehicle by a one-way clutch carried by a spindle extending from said sun gear.

The sun gear can be connected to the fixed part of the vehicle by a one-way clutch carried by the sun gear shaft.

The crown can be connected to the fixed part of the vehicle by a one-way clutch carried by said crown.

The invention also relates to a method of obtaining gear ratios using a transmission device that can consist in not allowing rotation of the crown in any of its two directions of rotation and in controlling the sun gear in a direction of rotation through the coupling between the engine shaft and said sun gear so as to obtain a gear ratio between said engine shaft and the planet gear carrier.

The method can consist in not allowing rotation of the sun gear in any of its two directions of rotation and in controlling the crown in a direction of rotation through the coupling between the engine shaft and the crown so as to obtain a gear ratio between said engine shaft and the planet gear carrier.

The method can consist in controlling the sun gear in a direction of rotation through the coupling between the engine shaft and this sun gear and in controlling the crown in a direction of rotation through the coupling between the engine shaft and the crown so as to obtain a gear ratio between the engine shaft and the planet gear carrier.

The invention also relates to a hybrid type motor vehicle comprising a powertrain with a speed variation transmission device that can comprise an electric machine electrically connected to electric accumulators and whose rotor is connected to the motion transmission track.

The transmission track can comprise an actuator driven into rotation by the rotor and allowing to connect the rotor of the machine to the epicyclic gear train by a toothed wheel and/or to the drive axle by a toothed pulley.

The transmission track can comprise an actuator driven into rotation by the rotor and allowing to connect the rotor of the machine to the drive axle by a stepped pinion.

The actuator can allow to connect the rotor to the planet gear carrier of the epicyclic gear train.

The actuator can allow to connect the rotor of the machine to the crown of the epicyclic gear train.

The transmission track can comprise a sliding pinion allowing to connect the toothed wheel to the epicyclic train gear and/or to the drive axle.

The planet gear carrier of the epicyclic gear train can comprise a toothed peripheral zone for cooperation with the sliding pinion.

The transmission track can comprise a pinion allowing to connect the toothed plate to the drive axle.

The transmission track can comprise a pinion fixedly carried by a sleeve comprising a toothed wheel for rotation transmission to the drive axle.

The sleeve can comprise a toothed peripheral face for cooperation with the sliding pinion.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
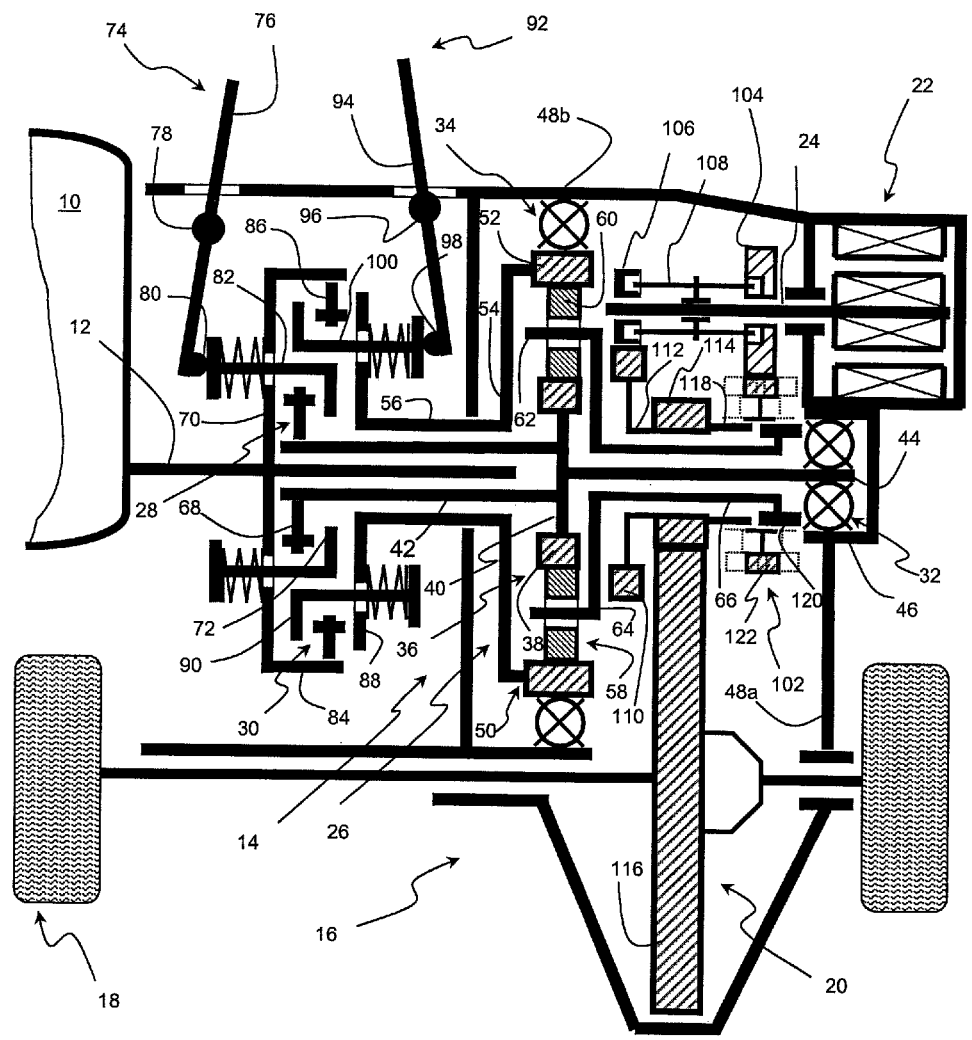
FIG. 1 is a diagram showing a speed variation transmission device according to the invention applied to a hybrid vehicle drive system.

In FIG. 1, the powertrain comprises a thermal engine 10, notably an internal-combustion engine, with a drive shaft 12, here the crankshaft of this engine, a speed variation transmission device 14 and a drive axle 16 allowing to drive driving wheels 18 of the vehicle by means of a differential bridge 20.

As explained below, drive shaft 12 also fulfils the function of a receiving shaft but, for simplification reasons, this shaft is only referred to as drive shaft so as to be able to distinguish it from the other shafts of the transmission device.

In an application to a hybrid vehicle, as illustrated in this figure, the powertrain also comprises an electric machine 22 with a rotor 24 that can work as an electric motor for driving the vehicle or as an electric power generator, more particularly as an alternator for charging the batteries (not shown).

Speed variation device 14 comprises an epicyclic gear train 26 with two controlled couplings 28, 30 and two automatic one-way couplings (or free wheels) 32, 34.

More precisely, epicyclic gear train 26 comprises a sun gear 36 with an externally toothed strip 38 and carried by a flange 40. This flange is fixedly mounted on a shaft 42, referred to as sun gear shaft, forming an input shaft, here a hollow shaft that tops shaft 12 of the engine while being free in rotation but fixed in translation with respect thereto. This flange is extended on the side opposite the engine by a spindle 44, coaxial to hollow shaft 42, whose free end rests on a bearing 46 carried by a fixed part 48*a* of the vehicle powertrain through one-way coupling 32 referred to as sun gear free wheel.

This train also comprises a crown 50 with an internally toothed ring 52 arranged concentric to the sun gear, and a shell 54 connected to a hollow shaft 56, referred to as crown shaft, forming another input shaft and surrounding hollow shaft 42 of the sun gear while remaining free in rotation, but fixed in translation with respect thereto. This crown is externally connected to a fixed part 48*b* of the vehicle powertrain by one-way coupling 34 referred to as crown free wheel.

Of course, the two free wheels 32 and 34 are arranged in such a way that crown 50 and sun gear 36 can rotate only in the same direction, and preferably in the same direction as shaft 12 of the engine.

Finally, this epicyclic train comprises a planet gear carrier 58 with at least one but advantageously three planet gears 60 in form of externally toothed wheels, arranged in the same angular interval with respect to one another (120° here) and meshing with the crown and the sun gear.

Ring 52 of the crown, strip 38 of the sun gear and planet gears 60 are therefore arranged in the same plane, here in a vertical plane considering FIG. 1.

These planet gears are carried each by a horizontal pin 62 while being free in rotation, but fixed in translation thereon. These planet gear pins are connected to a vertical wall 64 connected to a tubular shaft 66, referred to as planet gear carrier shaft, forming an output shaft by surrounding spindle 44 of the sun gear.

The free ends of the sun gear and crown shafts carry each a controlled coupling 28 and 30, preferably a friction clutch.

Thus, clutch 28, referred to as sun gear clutch, comprises a friction disk 68 carried fixedly in rotation, but free in translation on sun gear shaft 42. This friction disk is intended to be squeezed between a reaction plate 70, mounted fixed in translation and in rotation on shaft 12 of the engine, and a pressure plate 72, mobile in translation with respect to this reaction plate while being fixed in rotation therewith. The axial displacement of this pressure plate is controlled by a disengagement actuator 74. This actuator comes here in form of a rocker lever 76 pivoting on a fixed point 78 of the vehicle powertrain. One of its ends 80 controls this displacement by resting on tie rods 82 running through the reaction plate and connected to the pressure plate.

Pressure plate 70 is extended, beyond the tie rods, by a horizontal wall 84 that carries, fixed in rotation and free in axial translation, another friction disk 86, coaxial to friction disk 68 and which belongs to the other clutch 30, referred to as crown clutch.

The two clutches are thus interlinked so as to obtain a compact assembly.

This disk can be squeezed between a reaction plate 88, mounted fixed in translation and in rotation on the free end of crown shaft 56, and a pressure plate 90 mobile in axial translation under the action of another disengagement actuator 92. As above, this actuator comes in form of a rocker lever 94 pivoting on another fixed point 96 of the vehicle powertrain, with one of its ends 98 controlling this displacement by resting on tie rods 100 running through the reaction plate and connected to the pressure plate.

Thus, when sun gear clutch 28 is engaged, drive shaft 12 is connected to sun gear shaft 42 and sun gear 36 rotates at the same speed as this drive shaft 12. Similarly, when crown clutch 30 is active, drive shaft 12 is kinematically connected to crown shaft 56 and this crown is driven into rotation at the same speed as the drive shaft.

As illustrated in FIG. 1, planet gear carrier shaft 66 is connected to drive axle 16 by a motion transmission track 102 that is described more in detail below.

Figure 2:
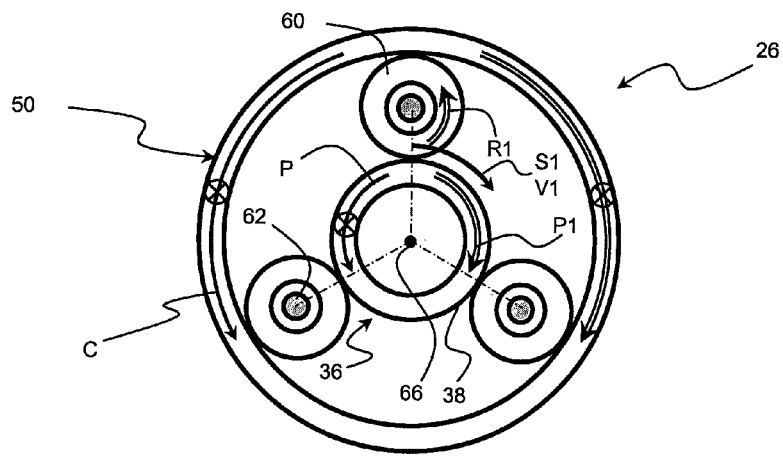
FIGS. 2 to 4 illustrate the various gear ratios obtained by the transmission device.
Figure 3:
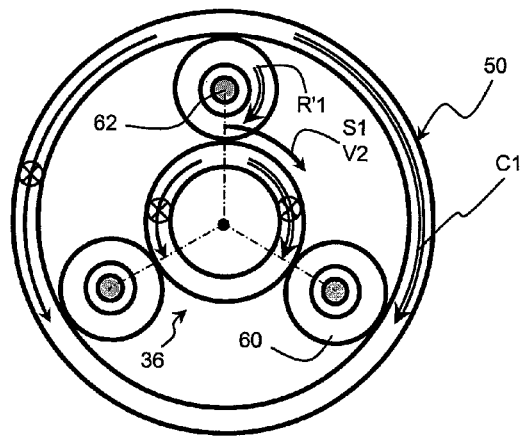
Figure 4:
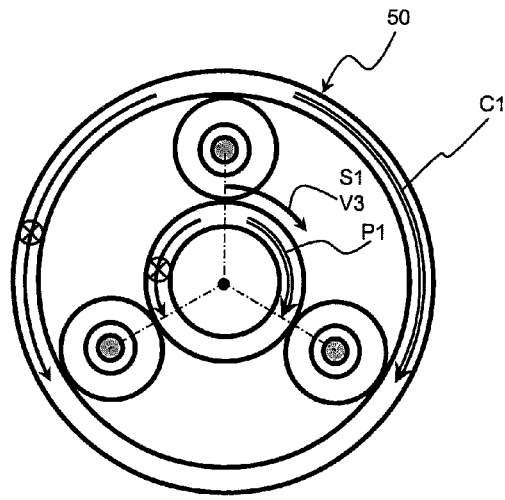

FIGS. 2 to 4 illustrate, in association with FIG. 1, the various configurations of epicyclic gear train 26 allowing to obtain three different gear ratios from shaft 12 of the engine to planet gear carrier shaft 66 and, consequently, from the drive axle through transmission track 102.

As already mentioned, sun gear 36 and crown 50 are continuously prevented from rotating, by the free wheels, in the direction of rotation shown in the figures by arrows C and P. This sun gear and this crown can therefore rotate only in the same direction of rotation as the engine output shaft, clockwise here.

In order to obtain a first gear ratio, disengagement actuators 74, 92 are used so that crown clutch 30 is inactive while in disengaged position and while releasing disk 86, and so that sun gear clutch 28 is operational by connecting shaft 12 of the engine to sun gear shaft 42 by squeezing disk 68. This sun gear is thus driven into rotation in direction P1, as shown in FIG. 2. Due to the meshing of toothed strip 38 with planet gears 60 of the planet gear carrier, the latter are driven into rotation about their axes 62 in direction R1. This rotation causes the planet gears to roll on the crown, which is fixed in rotation through free wheel 34, by cooperation of the teeth of these planet gears with the teeth of the crown. This allows to rotate the planet gear carrier assembly in direction S1, as shown in FIG. 2, with a gear ratio V1.

Rotation of the planet gear carrier is then transmitted to drive axle 16 by planet gear carrier shaft 66 (illustrated by a point here) and by motion transmission track 102 so as to drive driving wheels 18 of the vehicle by means of differential bridge 20.

For a second gear ratio (FIG. 3), disengagement actuators 74 and 92 are controlled in such a way that sun gear clutch 28 is inactive by making sun gear 36 stationary, and that crown clutch 30 is operational by connecting kinematically drive shaft 12 to crown 50. The crown is driven into rotation by drive shaft 12 in direction C1 and drives into rotation planet gears 60 about their axes 62 in direction R1. Due to this rotation and to sun gear 36 made stationary by free wheel 32, the planet gears roll on the toothed strip while driving the planet gear carrier assembly into rotation in the same direction S1 as in FIG. 2, but with a gear ratio V2 different from V1.

As mentioned above, the rotation of the planet gear carrier is then retransmitted to drive axle 16.

The third gear ratio (FIG. 4) is obtained by making the two clutches 28 and 30 operational through the action of the two disengagement actuators 74, 92. Shaft 12 of the engine is thus secured to both the sun gear shaft and the crown shaft by driving them both into rotation.

This has the effect of generating the rotation of the sun gear in direction P1 and of the crown in the same direction C1 and at the same speed as drive shaft 12.

It results from these different motions that the planet gear carrier is rotated in a direction S1 and with a gear ratio V3 different from the other two V1 and V2.

By means of this speed variation device comprising a sun gear with two clutches and two free wheels, it is easy to reliably obtain a speed variation with three different ratios between the drive shaft and the drive axle.

Of course, the person skilled in the art can calculate all the dimensions and all the values and shapes of the teeth in order to obtain the desired gear ratios.

In connection with FIG. 1 again, in an application to a hybrid vehicle, an electric machine 22 with a rotor 24 substantially parallel to planet gear carrier shaft 66 is additionally used.

This rotor carries an externally toothed wheel 104, fixed in translation on this rotor but free in rotation, as well as an externally toothed pulley 106 that is also fixed in translation on this rotor but free in rotation, while being at a distance from wheel 104.

A claw actuator 108 that can carry out three actions is arranged on rotor 24 and between the wheel and the pulley. This actuator is fixed in rotation but free in translation. Meshing of this actuator with both wheel 104 and pulley 106, as illustrated in FIG. 1, allows to achieve rotary connection between rotor 24 and both wheel 104 and pulley 106. In the situation of this actuator meshing with wheel 104 (right of FIG. 1), it establishes a rotary connection between rotor 24 and this wheel. In the opposite case of this actuator 108 meshing with pulley 106 (left in FIG. 1), it establishes the rotary connection of this pulley with rotor 24.

This pulley cooperates with a toothed pinion 110 carried by a sleeve 112 surrounding planet gear carrier shaft 66 and being coaxial thereto. This sleeve also carries a toothed transmission wheel 114 in mesh with a toothed wheel 116 connected to the drive axle. Finally, the free end of this sleeve comprises a toothed peripheral face 118 opposite toothed wheel 104 of the rotor.

The free end of planet gear carrier shaft 66 also carries, opposite toothed wheel 104, a toothed peripheral zone 120.

A double-toothed (external and internal) sliding pinion 122 cooperates, through its external toothed periphery, constantly with rotor wheel 104 and, through its internal toothed periphery, either with toothed zone 120 or with toothed face 118, or with both.

Of course, this sliding pinion and claw actuator 108, as well as disengagement actuators 74, 92, are controlled by any known control means such as jacks of any type (hydraulic, pneumatic, electric, . . . ) allowing either displacement in axial translation of the sliding pinion and of the claw actuator, or disengagement of clutches 28 and 30 through action on the free ends of levers 76 and 94. All these actions are of course carried out under the supervision of a control unit such as the calculator (not shown) of the powertrain any vehicle is equipped with.

We now describe the various configurations of the powertrain assembly according to the traction/propulsion mode used and/or to the operation of the thermal engine and of the electric machine.

Figure 5:
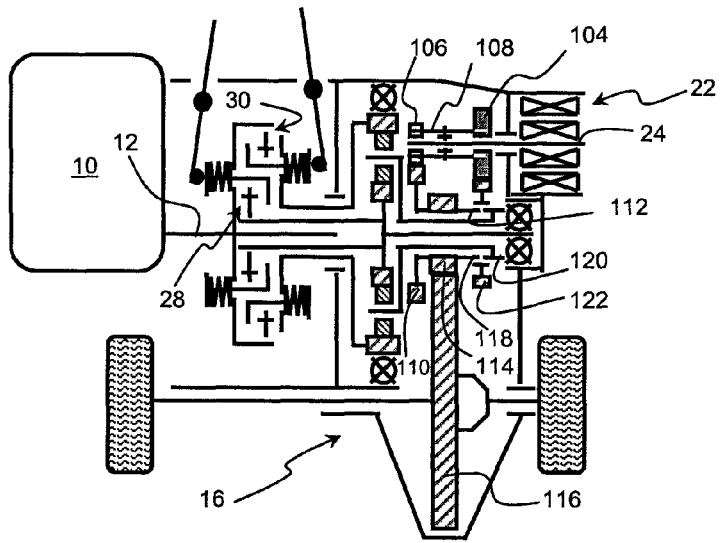
FIGS. 5 to 20 show the various configurations allowing travel drive of the vehicle and/or operation of some parts of this vehicle when it is stationary.

The configuration of FIG. 5 illustrates the electric mode wherein only electric machine 22 is used, notably as the motive machine of the vehicle.

Both couplings 28 and 30 are therefore inactive, actuator 108 meshing only with pulley 106 and sliding pinion 122 in mesh both with toothed face 118, toothed zone 120 and wheel 104.

As soon as electric machine 22 is electrically fed, its rotor 24 is driven into rotation and this machine works as an electric motor. This rotating motion is transmitted to pulley 106 by claw actuator 108.

The rotation of pulley 106 is then transmitted to pinion 110, then to toothed transmission wheel 114 carried by sleeve 112. This wheel 114, which cooperates with toothed axle wheel 116, thus allows to transmit this rotation to drive axle 16 with a low gear ratio.

Meshing of sliding pinion 122 with toothed face 118, toothed zone 120 and wheel 104 has no influence on the running because none of these elements is kinematically connected to either drive shaft 12 or rotor 24. This configuration however allows the start engine 10 again while the vehicle is driven in the electric mode.

This configuration allows the vehicle to run in forward gear while leaving the possibility for engine 10 of remaining in operation, notably for driving vehicle auxiliaries (power steering pump, air conditioning compressor, etc.).

Figure 6:
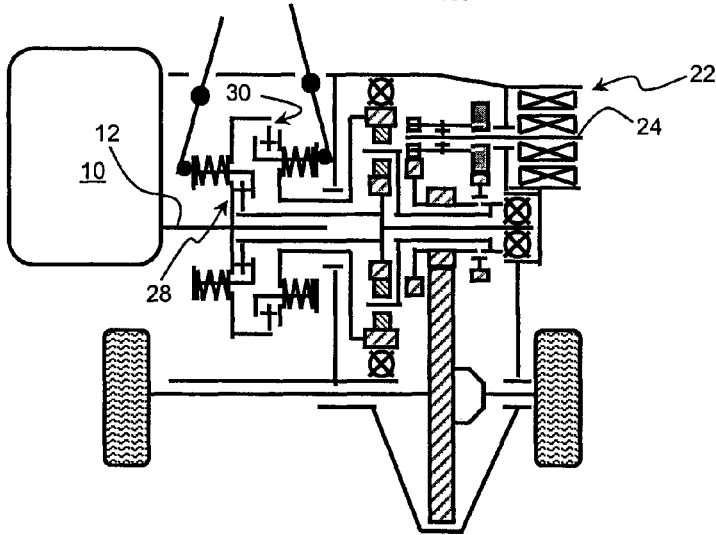

In the configuration of FIG. 6, the vehicle is operated in electric mode and the thermal engine is started.

Clutches 28 and 30 are therefore operational and actuator 108, as well as sliding pinion 122, are arranged in the position of FIG. 5, as described above.

As soon as rotor 24 is rotated or after it is brought into rotation, it is connected to shaft 12 of the engine by pulley 106, pinion 110, sliding pinion 122 that cooperates with both toothed face 118 of sleeve 112 and toothed zone 120 of planet gear carrier shaft 66, planet gears 60 of carrier 58, sun gear 36 whose shaft 42 is connected in rotation to drive shaft 12 through sun gear clutch 28 and crown 50 whose shaft 56 is connected in rotation to this drive shaft by crown clutch 30.

It is thus possible to start the thermal engine by rotating its drive shaft 12 under the action of rotor 24 of electric machine 22 and under the control of the calculator.

Of course, as soon as the thermal engine has been started, one or the other of disengagement actuators 74 or 92 (or both)

can be controlled so as to uncouple shaft 12 of the engine from rotor 24 by making clutch 28 or 30 (or both) controlled thereby inactive.

In this configuration, electric machine 22 has a double function, on the one hand, traction/propulsion of the vehicle and, on the other hand, starting the thermal engine while the vehicle is running.

Of course, the thermal engine can continue running, notably for driving its auxiliaries.

Figure 7:
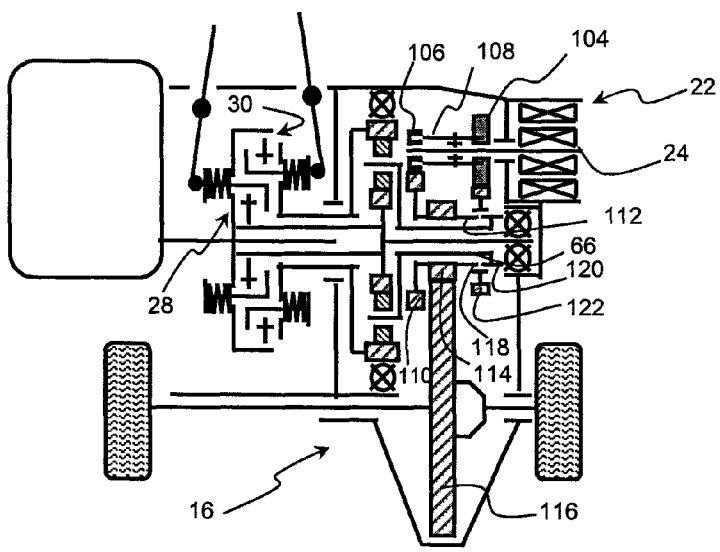
Figure 8:
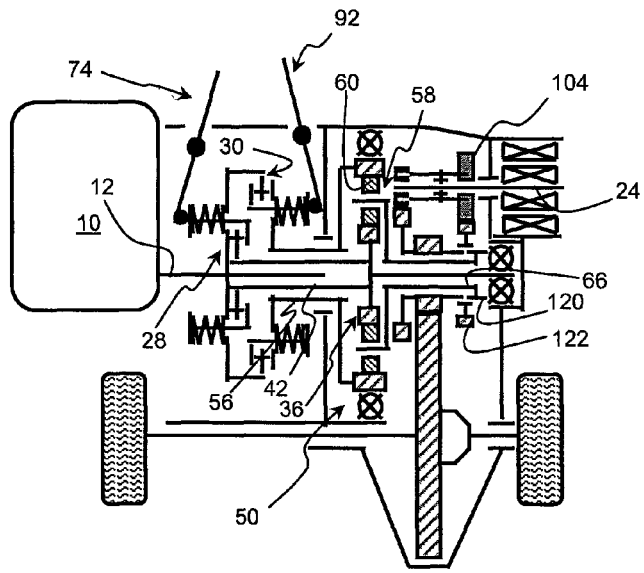

In the configurations illustrated in FIGS. 7 and 8, the functions obtained are similar to those of FIGS. 5 and 6, but with the vehicle driven with a high gear ratio.

Thus, in FIG. 7, which is the counterpart of FIG. 5, claw actuator 108 cooperates with wheel 104, sliding pinion 122 meshing with both toothed face 118 and toothed zone 120, and clutches 28 and 30 are inactive.

While electric machine 22 is being electrically supplied, rotor 24 is rotated and this rotating motion is transmitted to sliding pinion 122 by wheel 104.

Through its connection with toothed face 118 and toothed zone 120, this rotation of the sliding pinion is transmitted to sleeve 112 and to planet gear carrier shaft 66.

The rotation of the sleeve is then transmitted by toothed transmission wheel 114 to toothed wheel 116 of the axle.

This allows to transmit the rotation of rotor 24 to drive axle 16 with a high gear ratio.

Meshing of pinion 110 with pulley 106 has no influence on the operation because this pulley is free in rotation on the rotor. Similarly, the planet gear carrier shaft being driven into rotation by sliding pinion 122 has no influence on the operation because both clutches are inactive.

In the example illustrated in FIG. 8, the vehicle is operated in electric mode and the thermal engine is started, as in the example of FIG. 6, but with a high gear ratio.

The configuration is similar to FIG. 6 and to that of FIG. 7, which allows the vehicle to be driven, and bath clutches 28 and 30 are operational.

Shaft 12 of the engine is thus driven into rotation by rotor 24 through wheel 104, sliding pinion 122 that cooperates with toothed zone 120 of planet gear carrier shaft 66, planet gears 60 of carrier 58, sun gear 36 whose shaft 42 is connected in rotation to shaft 12 of the engine through sun gear clutch 28 and crown 50 whose shaft 56 is connected to this drive shaft by crown clutch 30.

As already mentioned, after starting the thermal engine, disengagement actuators 74 and 92 can be controlled so as to uncouple drive shaft 12 from rotor 24.

Figure 9:
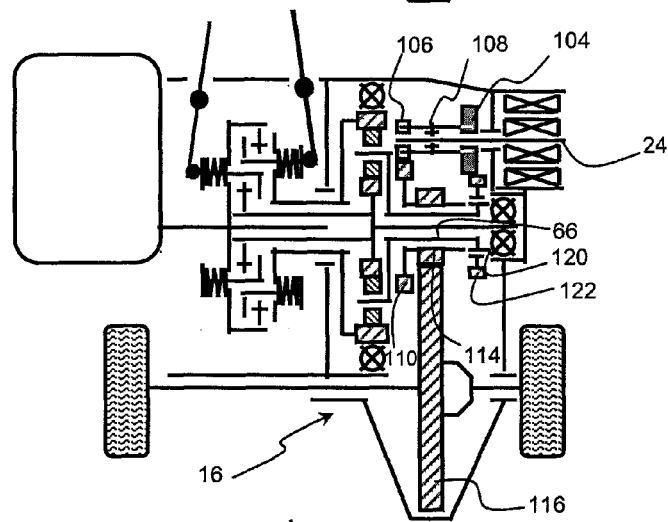
Figure 10:
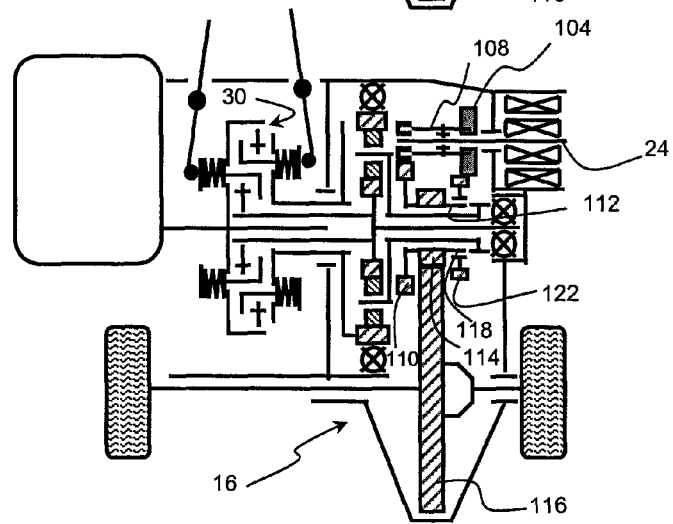

The configurations of FIGS. 9 and 10 are similar to those of FIGS. 5 and 7, but with a position of sliding pinion 122 that allows not to cause rotation of the planet gear carrier while providing traction/propulsion of the vehicle in electric mode.

In the case of FIG. 9, actuator 108 is in mesh with pulley 106 and sliding pinion 122 is engaged with wheel 104 and toothed zone 120 of planet gear carrier shaft 66.

The rotation of rotor 24 is thus transmitted to axle 16 with a low ratio by pulley 106, pinion 110, transmission wheel 114 and toothed axle wheel 116.

Similarly, in the case of FIG. 10, actuator 108 is in mesh with toothed wheel 104 and sliding pinion 122 is engaged with toothed wheel 104 and toothed face 118 carried by sleeve 112.

Thus, the rotation of rotor 24 is transmitted to axle 16 with a high ratio by means of wheel 104, sliding pinion 122, transmission wheel 114 and toothed axle wheel 116.

In the case of FIG. 9 as well as FIG. 10, no rotating motion is transmitted to an element of the sun gear, which can only improve the operation of the device, notably through the possibility of reverse gear and loss decrease.

The configurations of FIGS. 11 to 14 illustrate the traction/propulsion of the vehicle by thermal engine 10 with gear ratios V1 to V3, shown in FIGS. 2 to 4, and the various possibilities of using electric machine 22 as an electric generator.

Figure 11:
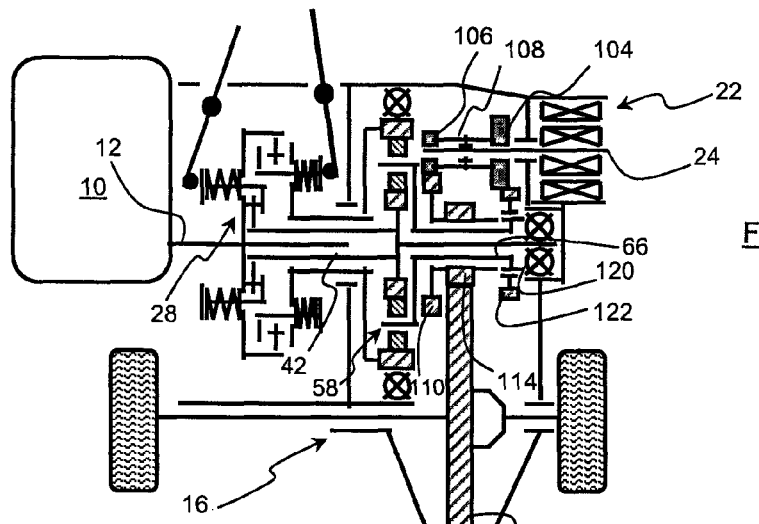
Figure 12:
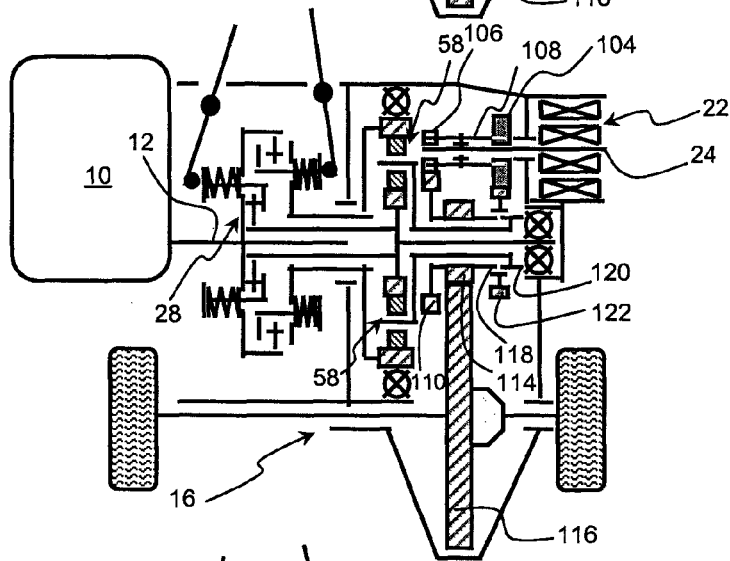

Thus, for FIGS. 11 and 12, the ratio used, V1, corresponds to that of FIG. 2.

For the configuration of FIG. 11, sun gear clutch 28 is active by securing shaft 12 of engine 10 to sun gear shaft 42, actuator 108 in mesh with wheel 104 and with pulley 106, sliding pinion 122 in mesh with wheel 104 and toothed zone 120 carried by planet gear carrier shaft 66.

The rotation of drive shaft 12 allows, as already described in connection with FIG. 2, to drive into rotation planet gear carrier 58 with gear ratio V1. This rotation is transmitted to sliding pinion 122 that retransmits it to wheel 104. Considering the meshing of actuator 108 with this wheel, this rotation is transmitted to rotor 24 of electric machine 22 and to pulley 106. This pulley communicates this rotation to pinion 110 which itself transfers it to toothed transmission wheel 114 through sleeve 112. This toothed wheel 114 meshes then with toothed axle wheel 116 for driving drive axle 16 into rotation.

As regards the configuration of FIG. 12, sun gear clutch 28 is active by securing shaft 12 of engine 10 to sun gear shaft 42, actuator 108 being meshed with pulley 106 and sliding pinion 122 with wheel 104 and toothed zone 120 carried by planet gear carrier shaft 66, as well as toothed face 118.

The rotation of drive shaft 12 thus allows to drive into rotation planet gear carrier 58 with gear ratio V1. This rotation is transmitted to sliding pinion 122 that transmits it to wheel 104 and to toothed peripheral face 118 of sleeve 112.

Through this rotary connection with the sleeve, the rotating motion of sliding pinion 122 is transmitted to pinion 110 and to wheel 114 that retransmits it to wheel 116, then to drive axle 16.

As regards the rotating motion of pinion 110, it is then transmitted to rotor 24 through meshing thereof with actuator 108.

Thus, for the example of FIG. 11 and of FIG. 12, the vehicle is driven into displacement by thermal engine 10 with two different final gear ratios, the gear ratio illustrated in FIG. 11 being lower than the one illustrated in FIG. 12.

On the other hand, rotor 24 of machine 22 is driven with two different speeds also linked with the same ratio V1 of the train.

This rotor thus rotates at a speed when sliding pinion 122 meshes with toothed zone 120 and with wheel 104 (FIG. 11) and at another speed when this sliding pinion drives it into connection with the planet gear carrier shaft through pinion 110 carried by sleeve 112 (FIG. 12).

Electric machine 22 that is used, in both cases, as an electric generator, notably for recharging the batteries, can thus have two charging regimes for these batteries.

Figure 13:
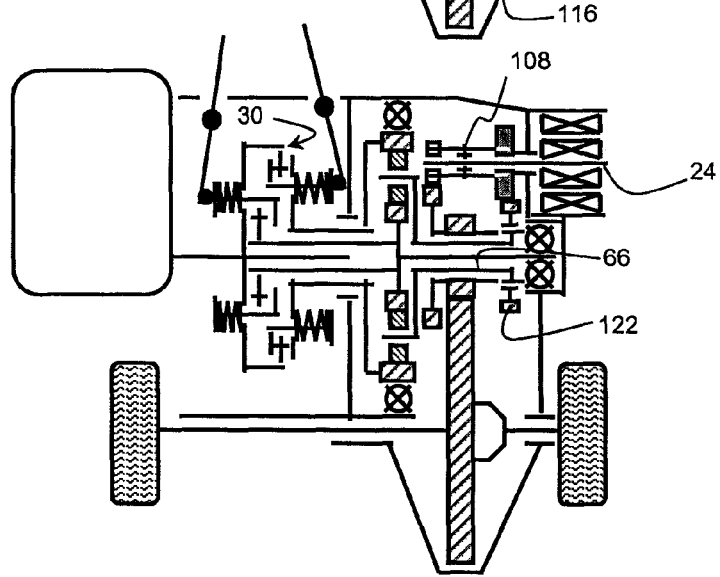
Figure 14:
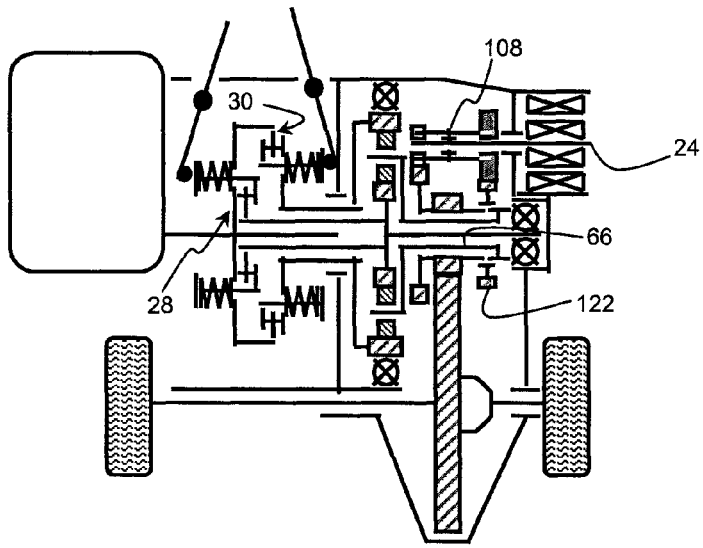

The examples of FIGS. 13 and 14 illustrate the configurations according to which crown clutch 30 is active (FIG. 13) with the effect of obtaining ratio V2 at planet gear carrier shaft 66, as described in FIG. 3, or sun gear clutch 28 and crown clutch 30 are active (FIG. 14) with the result of ratio V3 at planet gear carrier shaft 66, as described in FIG. 4.

Of course, the various positions of sliding pinion 122 and of actuator 108 of FIGS. 11 and 12 can also be used within the context of FIGS. 13 and 14 to obtain the various rotating speeds of rotor 24.

Figure 15:
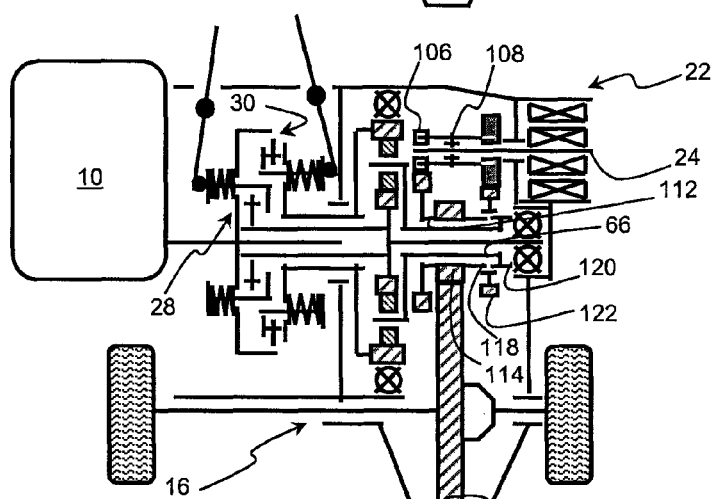
Figure 16:
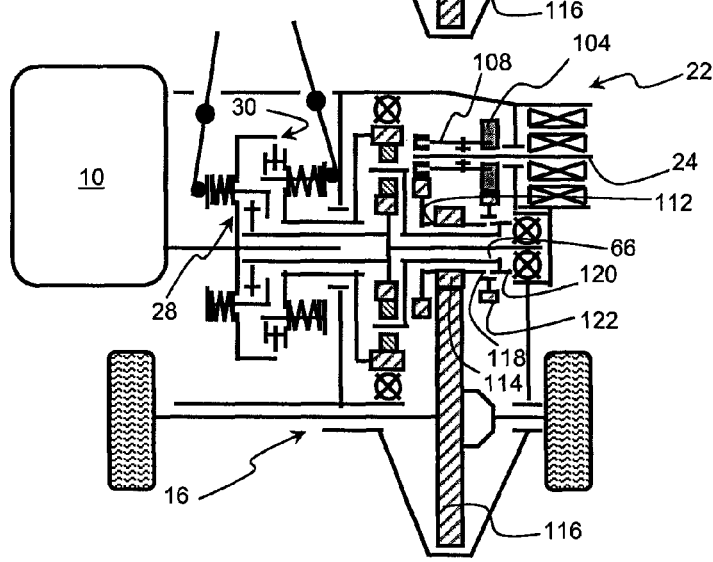

In the configuration of FIGS. 15 and 16, the traction/propulsion of the vehicle is provided by electric machine 22 associated with thermal engine 10.

As mentioned above, clutches 28 and 30 are controlled so as to obtain one of the three gear ratios V1 to V3 at planet gear carrier shaft 66. The rotation of this shaft is then transmitted by wheel 114 to wheel 116, then to axle 16 so as to drive the vehicle in displacement.

Simultaneously, actuator 108 is in mesh with either toothed pulley 106 (FIG. 15) or wheel 104 (FIG. 16), and the sliding pinion is in mesh with wheel 104 and toothed face 118, as well as toothed zone 110 (FIGS. 15 and 16).

Machine 22 is electrically supplied by the batteries so as to run as an electric motor with the rotation of rotor 24. This rotation is transmitted to sleeve 112 by pulley 106 (FIG. 15) or by wheel 104 and sliding pinion 122 (FIG. 16).

Therefore, the power generated by this electric motor is transmitted by toothed transmission wheel 114 to toothed wheel 116 while coming on top of that provided by the thermal engine.

Figure 17:
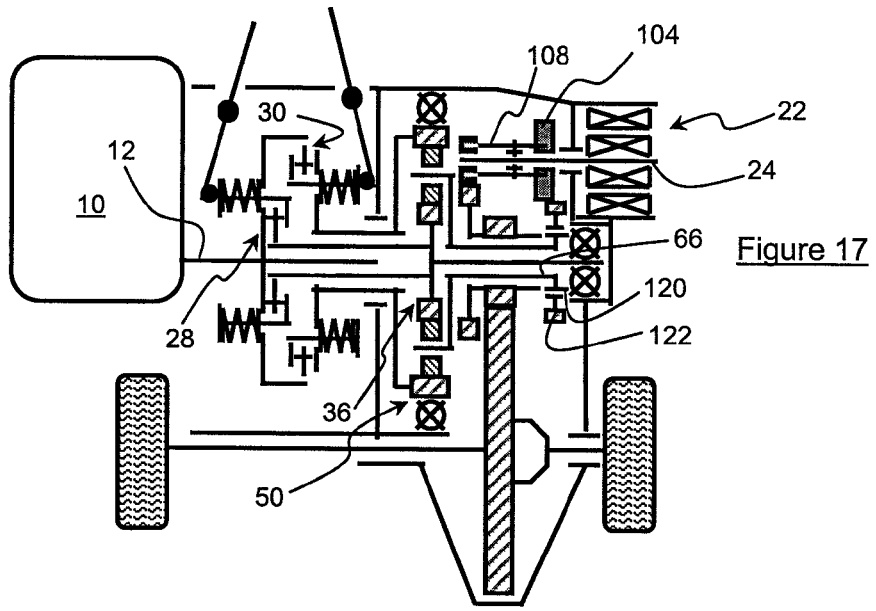

For starting thermal engine 10 while the vehicle is stationary, the configuration of FIG. 17 is used with machine 22 working as an electric starter.

Both clutches 28 and 30 are therefore active, actuator 108 is in mesh with wheel 104, and sliding pinion 122 with this wheel 104 and toothed zone 120 of planet gear carrier shaft 66.

As soon as machine 22 is electrically supplied by the batteries, its rotor 24 is driven into rotation. Considering the rotary connection between the rotor and wheel 104, the latter is driven into rotation. This rotation is then transmitted to sliding pinion 122, then to planet gear carrier shaft 66. The rotation of this shaft generates the rotation of crown 50 and of sun gear 36 which in turn drive engine shaft 12 into rotation.

This thermal engine is thus started, under the control of the calculator.

Of course, as soon as the engine is started, the clutches can be made inactive so as to disengage engine 10 from machine 22.

As regards battery recharging alone when the vehicle is in a stationary condition, the configuration is the one already described in connection with FIG. 17, except for the fact that shaft 12 of the engine is already rotating and that machine 22 operates as an electric generator.

The rotation of drive shaft 12 is thus transmitted to planet gear carrier shaft 66 with one of the three gear ratios V1 to V3, then to sliding pinion 122. The latter transmits its rotation to wheel 104, then to rotor 24.

This rotation of the rotor thus allows to use the electric machine as a generator for recharging the batteries and/or supplying accessories of the vehicle.

Figure 18:
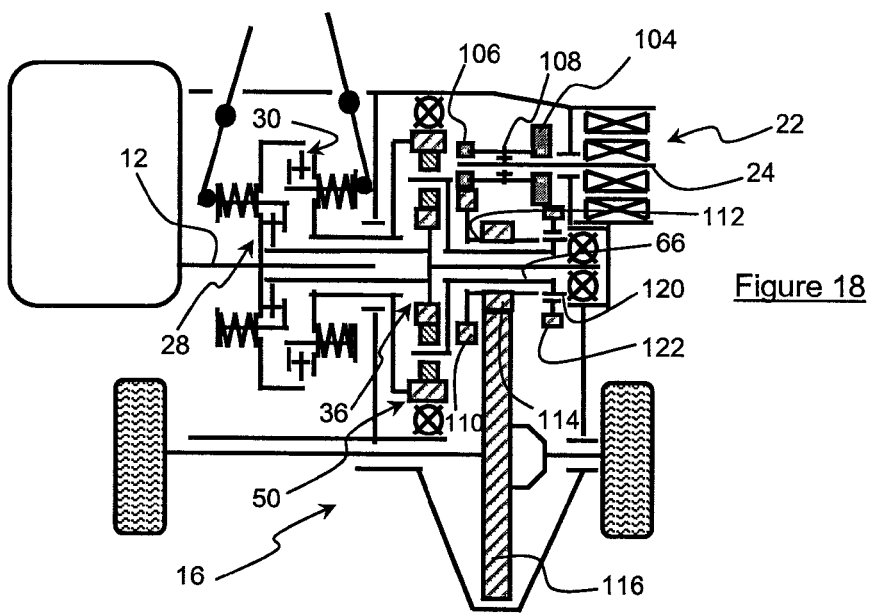

As regards engine braking, the configuration used corresponds to that of FIG. 18 with clutches 28 and 30 in active position, actuator 108 in mesh with wheel 104 and with pulley 106, and sliding pinion 122 in mesh with this wheel 104 and toothed zone 120 of planet gear carrier shaft 66.

Drive axle 16 drives toothed axle wheel 116 and toothed transmission wheel 114 carried by sleeve 112 into rotation. Rotation of the sleeve is transmitted by pinion 110 to pulley 106 that transmits it to rotor 24 and wheel 104. This rotation of wheel 104 is then retransmitted to sliding pinion 122, to planet gear carrier shaft 66 and finally to drive shaft 12 via crown 50 and sun gear 36.

Considering the rotary connection between axle 16 and drive shaft 12, the latter transmits a negative torque and slows down the rotation of planet gear carrier shaft 66. This slowing down is then transmitted to the drive axle so as to decrease its rotating speed.

Figure 19:
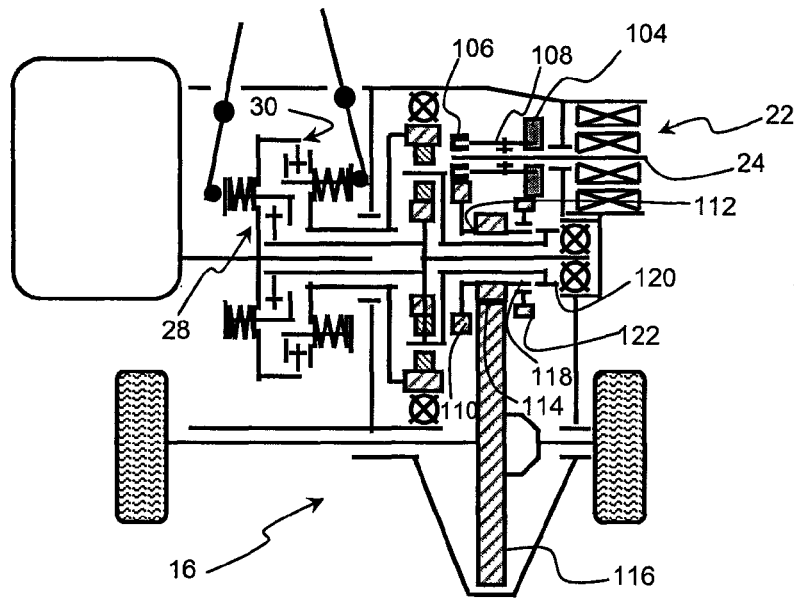

According to the configuration illustrated in FIG. 19, it is possible to recover brake energy.

Actuator 108 is in mesh, either with wheel 104 or with toothed pulley 106 (not shown), and the sliding pinion engages with wheel 104 and toothed face 118 (FIG. 19) or toothed zone 120 (not shown).

The position of clutches 28 and 30 is of no consequence on the energy recovery.

During braking, the energy to be recovered goes from axle 16 to wheel 116, then to wheel 114. The rotation of this toothed wheel 114 causes rotation of sleeve 112 and of pulley 106 through pinion 110 or of wheel 104 through sliding pinion 122 (not shown).

In both cases, this provides rotation of rotor 24. This rotation is thus used for converting machine 22 to an electric generator.

Figure 20:
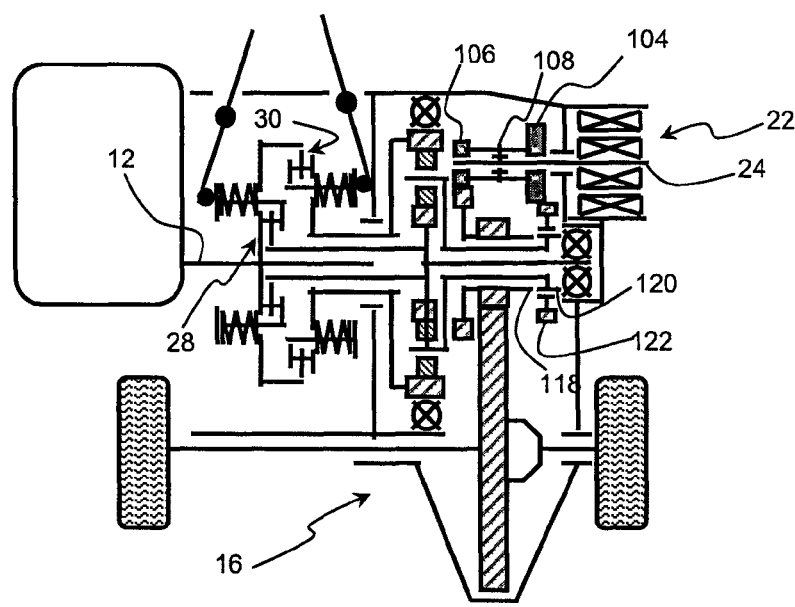

In the situation of FIG. 20, both brake energy recovery and engine braking are achieved.

Clutches 28 and 30 are therefore active, actuator 108 is in mesh both with wheel 104 and with pulley 106, or either with wheel 104 or with pulley 106 (not shown), and sliding pinion 122 engages with this pulley 106 and toothed zone 120 of planet gear carrier shaft 66, or with this pulley 106, toothed zone 120 of planet gear carrier shaft 66 and toothed face 118 of sleeve 112 (not shown).

Axle 16 is thus connected both with rotor 24 in order to use machine 22 as a generator and with drive shaft 12 for engine braking.

Figure 21:
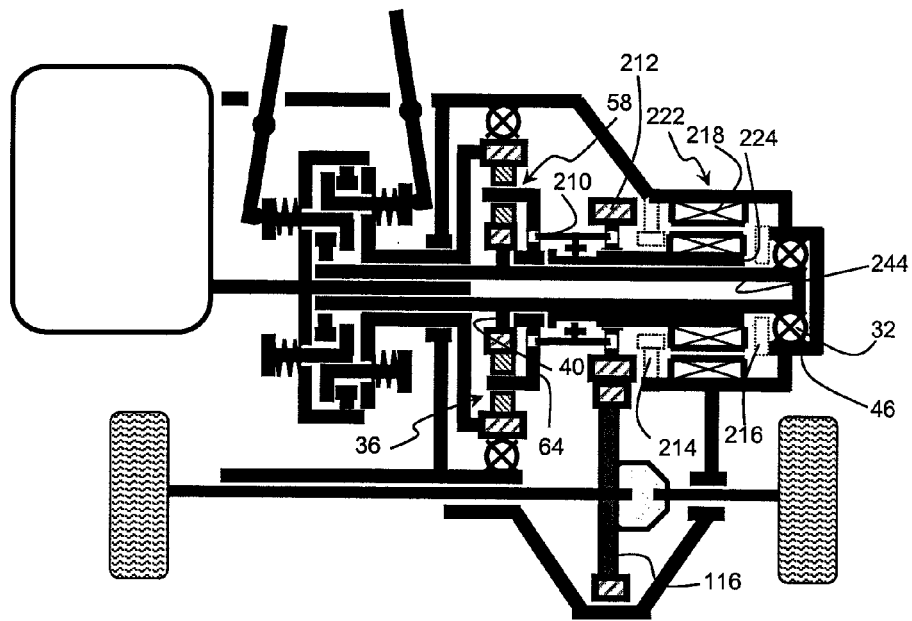
FIGS. 21 to 28 illustrate other variants of the vehicle drive system of FIG. 1.

In the variant illustrated in FIG. 21, which comprises the same reference numbers for the elements common to those of FIG. 1, rotor 224 of electric machine 222, in tubular form here, is coaxial to spindle 244. This spindle is configured as a hollow tube connected to flange 40 of sun gear 36 and it rests on free wheel 32 arranged in bearing 46.

Rotor 224 of this machine surrounds this spindle and carries, in the vicinity of its free end opposite planet gear carrier 58, a claw actuator 210, fixed in rotation but free in translation on this rotor.

This actuator is intended to be in mesh with vertical wall 64 of planet gear carrier 58 and/or with a toothed pulley 212 cooperating in mesh with toothed axle wheel 116.

Advantageously, it is possible to arrange walls 214 and 216 on either side of body 218 of the electric machine so as to isolate it from the transmission device and thus to obtain an engine referred to as dry engine.

For simplification reasons, all mentions of a claw actuator mean that this actuator is free in translation on the element that carries it while being fixed in rotation with respect thereto.

Figure 22:
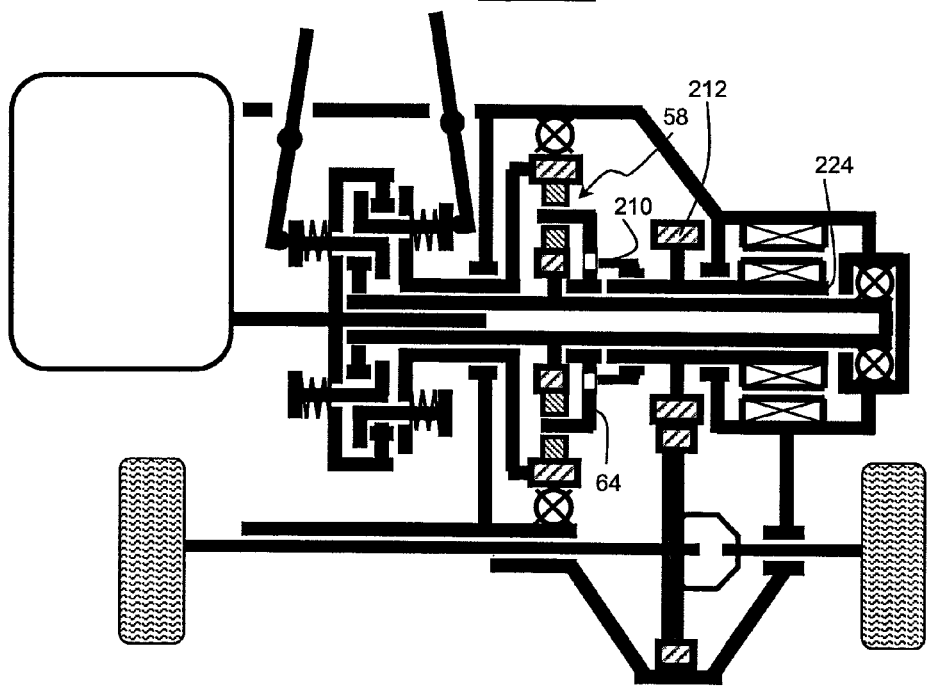

As for the variant of FIG. 22, it differs from FIG. 21 in that toothed pulley 212 is mounted fixed in rotation and in translation on rotor 224. Claw actuator 210 can therefore be in mesh only with wall 64 of planet gear carrier 58.

Figure 23:
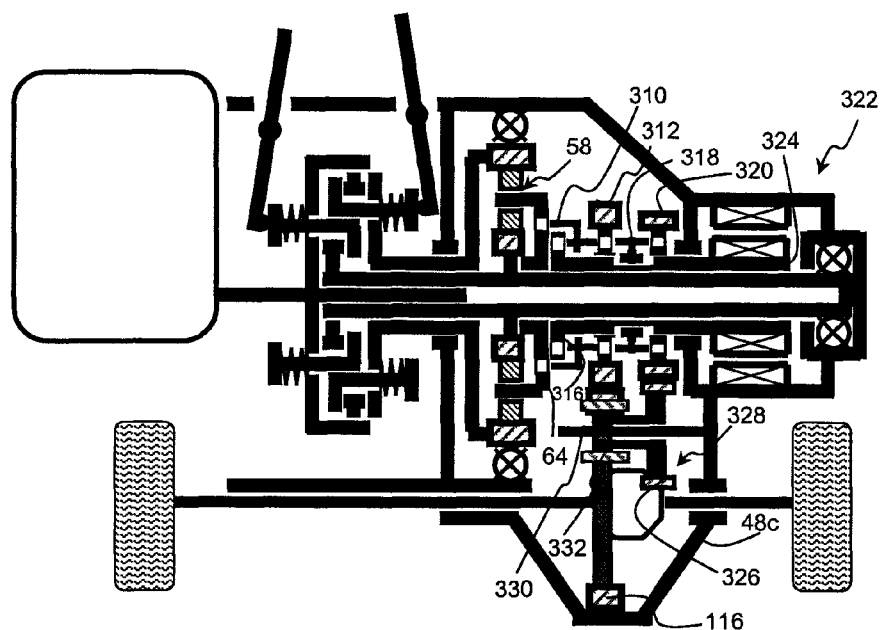

In the variant of FIG. 23, electric machine 322 is in the same configuration as in FIG. 21.

Its rotor 324 carries a first claw actuator 310 that can be in mesh with wall 64 of planet gear carrier 58 or with a toothed pulley 312, fixed in translation and free in rotation on this rotor, which cooperates in mesh with toothed axle wheel 116, or with a flange 316 fixed on the rotor.

This rotor also carries another claw actuator 318 that can be in mesh with either toothed pulley 312 or with a toothed pinion 320 also carried fixed in translation and free in rotation on this rotor.

This pinion cooperates with a step 326 of a stepped toothed pinion 328 brought into rotation by a pin 330 from a fixed part 48c of the vehicle. The other step 332 of this stepped pinion cooperates with toothed axle wheel 116.

Figure 24:
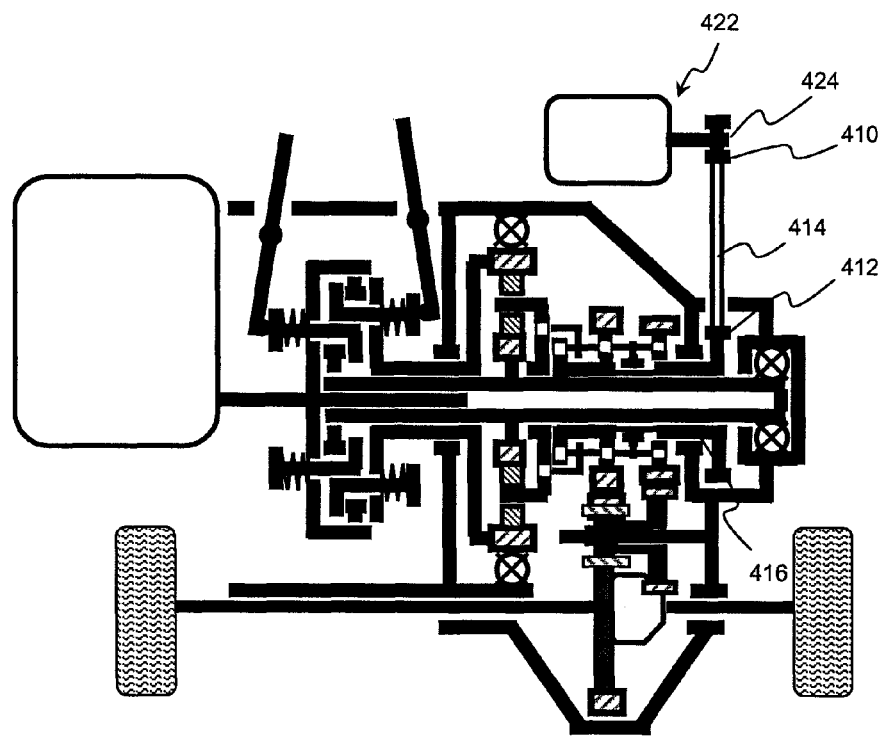

The variant of FIG. 24 shows a particular layout of electric machine 422 in relation to that of FIG. 23.

This machine is arranged outside the transmission device and it comprises a rotor 424 with a pulley 410 that is connected to a plate 412 by any suitable means such as a belt or a chain 414.

This plate is fastened to a hollow tube 416 which, within the context of FIG. 21, served as the rotor of this electric machine.

Any rotation of rotor 424 is therefore directly transmitted to tube 416.

Figure 25:
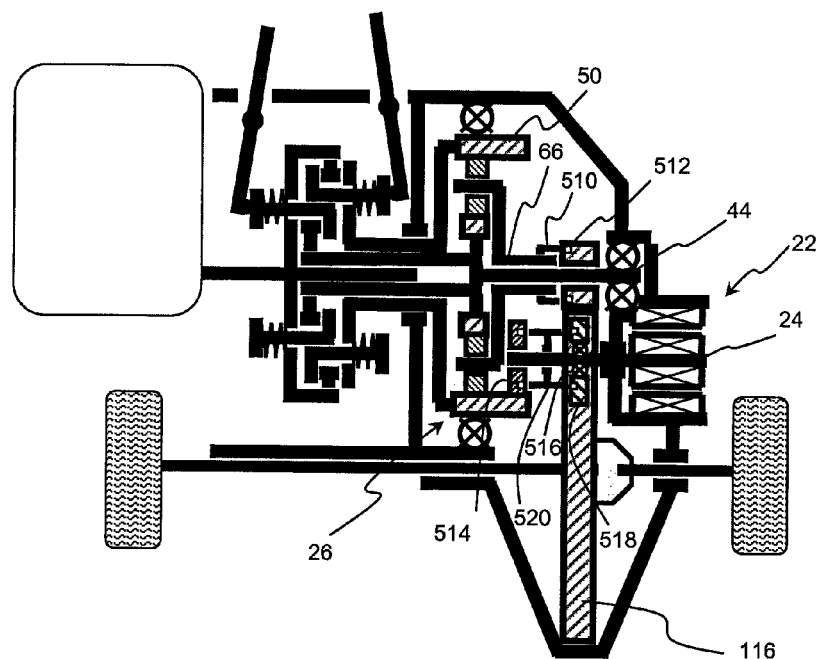

In FIG. 25, planet gear carrier shaft 66 carries a claw actuator 510 for cooperation with a toothed wheel 512, carried by spindle 44 while being free in rotation and fixed in translation.

Rotor 24 of electric machine 22 which is arranged parallel to spindle 44, carries, in the vicinity of its free end, a toothed wheel 514, free in rotation and fixed in translation with respect to this rotor, which cooperates with the teeth of crown 50 of epicyclic gear train 26. This rotor also carries a free wheel 516 on which is mounted another toothed wheel 518, fixed in translation and cooperating with axle wheel 116. A claw actuator 520 is arranged between these two wheels so as to be in mesh alternately with one or the other of these toothed wheels.

Figure 26:
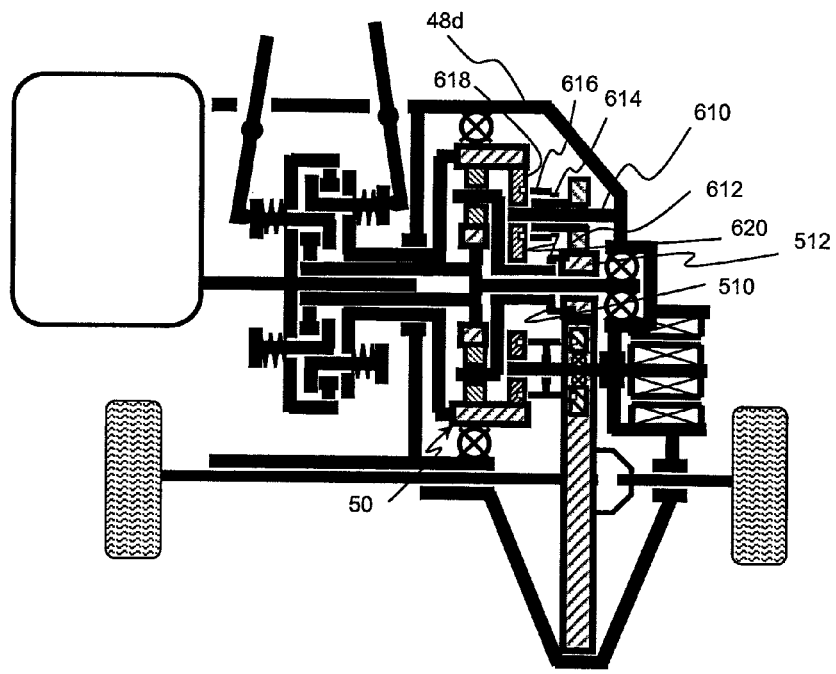

FIG. 26 differs from FIG. 25 in the addition of a pin 610 from a fixed part 48d of the vehicle while being parallel to the pin of the rotor. This pin carries a toothed wheel 612, free in rotation and fixed in translation, and which cooperates with wheel 512. This toothed wheel 612 is provided with a fixed bearing 614 housing a claw actuator 616 intended to cooperate with a toothed wheel 618 cooperating with the teeth of crown 50.

Claw actuator 510 of the spindle is connected to claw actuator 616 of the additional pin by means of a tilt control system 620 that prevents the two actuators from being simultaneously in mesh. Thus, as illustrated in this figure, when actuator 510 is in mesh with wheel 512, actuator 616 cannot be in mesh with wheel 618.

Figure 27:
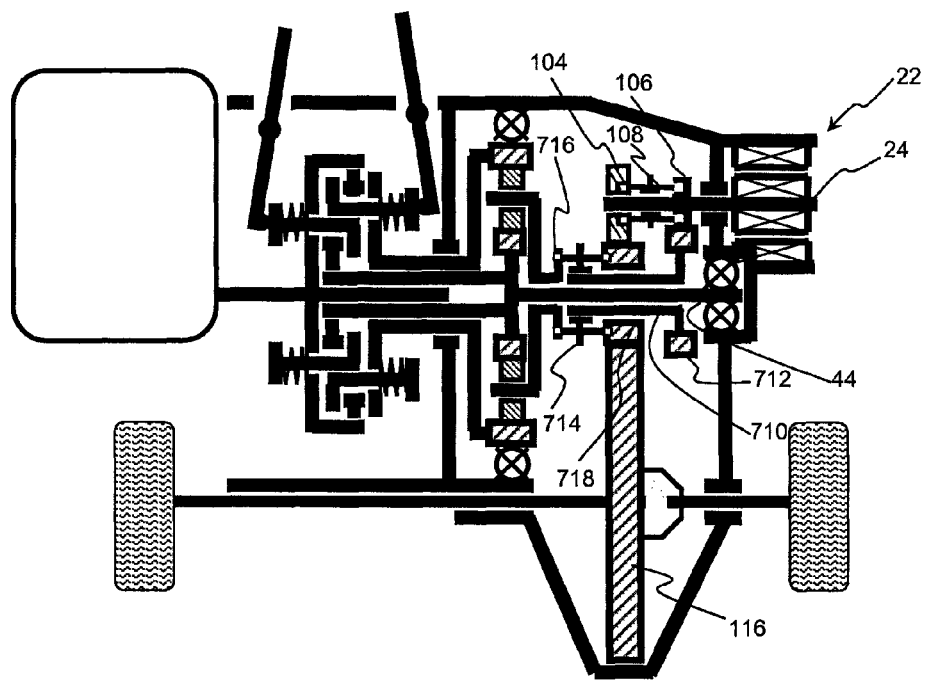

In FIG. 27, electric machine 22 comprises a rotor 24 with a pulley 104, a wheel 106 and a claw actuator 108 similar to FIG. 1.

Spindle 44 is surrounded by a tubular shaft 710 carrying a toothed plate 712 that cooperates with wheel 106. In the vicinity of the free end thereof, the tubular shaft carries a claw actuator 74 that can cooperate with a plate 716 carried by planet gear carrier shaft 66 or with a toothed wheel 718, carried by tubular shaft 710, fixed in translation and free in rotation thereon, and which engages with toothed axle wheel 116.

Figure 28:
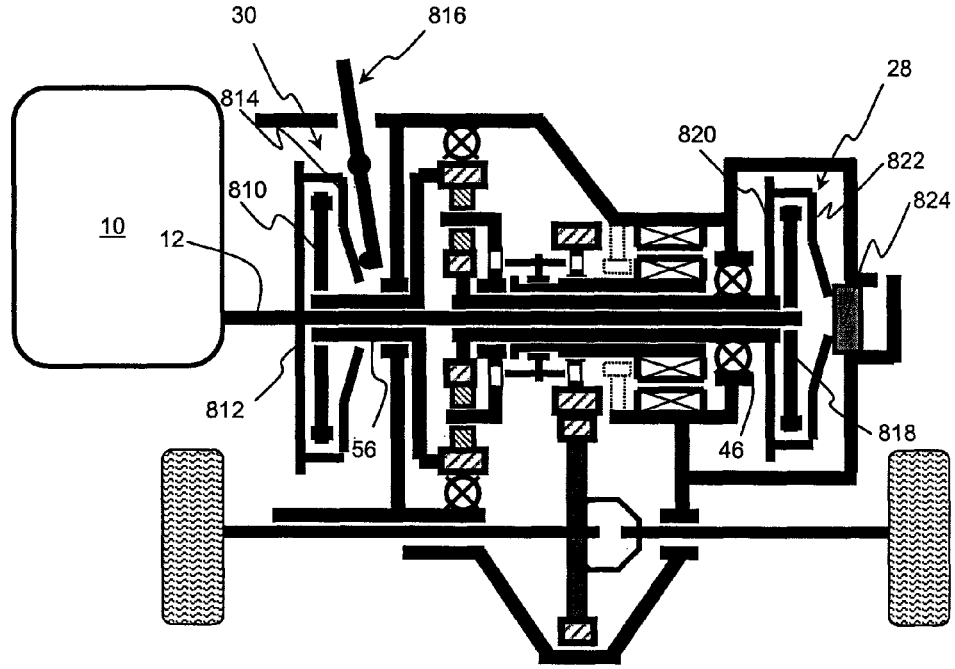

The example of FIG. 28 differs from that of FIG. 21 in that clutches 28 and 30 are no longer interlinked.

Thus, for crown clutch 30, crown shaft 56 carries, on the side of engine 10, a friction disk 810. This disk is intended to be squeezed between a reaction plate 812 fixedly carried by shaft 12 of the engine and a pressure plate 814 subjected to an axial displacement under the action of a disengagement actuator 816.

As regards sun gear clutch 28, drive shaft 12 is extended beyond bearing 46. The end of the extension thus carries a friction disk 818 that is intended to be squeezed between a reaction plate 820 carried by sun gear shaft 42 and a pressure plate 822 mobile in axial translation under the effect of a disengagement actuator 824.

Of course, all the functions obtained from FIG. 1 and illustrated in the configurations of FIGS. 2 to 20 can also be achieved from FIGS. 21 to 28 by suitably controlling all or part of the actuators.

It can be pointed out that, in the case of the figures described above, motion transmission track 102 comprises all the elements contained between planet gear carrier shaft 66 and axle 16, which allow to provide kinematic connection between this shaft and this axle.

Thus, by way of example for FIG. 1, track 102 comprises the elements including toothed face 120, sliding pinion 122, wheel 104, claw actuator 108, pulley 106, pinion 110 and toothed transmission wheel 114, as well as toothed face 118, carried by sleeve 112, and toothed axle wheel 116 connected to axle 16.

Similarly, all or part of this motion transmission track is used with electric machine 22 to fulfil the various functions, such as driving the axle into rotation (alone or in combination with the thermal engine), starting the thermal engine, recharging the batteries, etc.

The invention claimed is:

1. A hybrid type motor vehicle comprising a powertrain with a speed variation transmission device, the transmission device comprising an epicyclic gear train, the epicyclic gear train comprising a first sun gear and a first crown, the first sun gear and the first crown being connected to an engine shaft of a thermal engine of the vehicle, the epicyclic gear train further comprising a planet gear carrier connected by a motion transmission track to a drive axe of the vehicle, characterized in that the first sun gear is connected to the engine shaft by a first controlled coupling and to a first fixed part of the vehicle by a first one-way coupling, the first crown is connected to the engine shaft by a second controlled coupling and to a second fixed part of the vehicle by a second one-way coupling, and a second sun gear and a second crown are not connected between the first sun gear and the first controlled coupling or the first crown and the second controlled coupling, characterized in that the vehicle further comprises an electric machine electrically connected to electric accumulators, and a rotor of the electric machine is connected to the motion transmission track, and characterized in that the transmission track comprises a sliding pinion, and the sliding pinion is configured to connect a toothed wheel to the epicyclic gear train and/or to the drive axle.

2. The hybrid type motor vehicle as claimed in claim 1, characterized in that the transmission track comprises an actuator driven into rotation by the rotor, and the actuator is configured to connect the rotor of the machine to the epicyclic gear train by the toothed wheel and/or the actuator is configured to connect the rotor of the machine to the drive axle by a toothed pulley.

3. The hybrid type motor vehicle as claimed in claim 1, characterized in that an actuator is configured to connect the rotor to the planet gear carrier of the epicyclic gear train.

4. The hybrid type motor vehicle as claimed in claim 1, characterized in that the planet gear carrier of the epicyclic gear train carries a toothed peripheral zone for cooperation with the sliding pinion.

5. The hybrid type motor vehicle as claimed in claim 1, characterized in that the transmission track comprises a second pinion, and the second pinion is configured to connect a toothed pulley to the drive axle.

6. The hybrid type motor vehicle as claimed in claim 5, characterized in that the transmission track comprises the second pinion fixedly carried by a sleeve comprising a toothed wheel for rotation transmission to the drive axle.

7. The hybrid type motor vehicle as claimed in claim 1, characterized in that the first crown is connected directly to the second controlled coupling by a crown shaft, and the first crown is connected directly to the second one-way coupling.

8. A hybrid type motor vehicle comprising a powertrain with a speed variation transmission device, the transmission device comprising an epicyclic gear train, the epicyclic gear train comprising a first sun gear and a first crown, the first sun gear and the first crown being connected to an engine shaft of a thermal engine of the vehicle, the epicyclic gear train further comprising a planet gear carrier connected by a motion transmission track to a drive axle of the vehicle, characterized in that the first sun gear is connected to the engine shaft by a first controlled coupling and to a first fixed part of the vehicle by a first one-way coupling, the first crown is connected to the engine shaft by a second controlled coupling and to a second fixed part of the vehicle by a second one-way coupling, and a second sun gear and a second crown are not connected between the first sun gear and the first controlled coupling or the first crown and the second controlled coupling, characterized in that the vehicle further comprises an electric machine electrically connected to electric accumulators, and a rotor of the electric machine is connected to the motion transmission track, characterized in that the transmission track comprises a sleeve pinion, and the sleeve pinion is configured to connect a toothed pulley to the drive axle, characterized in that the transmission track comprises the sleeve pinion fixedly carried by a sleeve comprising a toothed wheel for rotation transmission to the drive axle, and characterized in that the sleeve further comprises a toothed peripheral face for cooperation with a sliding pinion.

* * * * *